FIG. I.

United States Patent Office 3,553,294
Patented Jan. 5, 1971

3,553,294
POLYESTERS CONTAINING BICYCLO[2.2.1]HEPT-2-YL ACRYLATE AND METHACRYLATE
Charles W. McGary, Jr., Charleston, and Percy L. Smith, Dunbar, W. Va., assignors to Union Carbide Corporation, a corporation of New York
Filed July 24, 1967, Ser. No. 655,554
Int. Cl. C08l 21/00
U.S. Cl. 260—871                                    5 Claims

ABSTRACT OF THE DISCLOSURE

Unsaturated polyesters are reacted with or crosslinked with bicyclo[2.2.1]hept-2-yl acrylate (BCHA) and the corresponding bicyclo[2.2.1]hept-2-yl methacrylate (BCHMA) either alone or in combination with other vinyl monomers commonly used for crosslinking unsaturated polyester resins. The use of or the incorporation of BCHA or BCHMA in polyester premixes drastically reduces the loss of vinyl monomer in polyester premixes and improves the ultraviolet stability without deleteriously affecting the resin properties. Examples are given illustrating the reduction of volatility of unsaturated polyester premixes which employ styrene and vinyltoluene as crosslinking monomers in combination with either BCHA or BCHMA. The resinous products containing BCHA or BCHMA are useful as molding compositions, protective coatings, adhesives and laminating resins.

Figure 1:
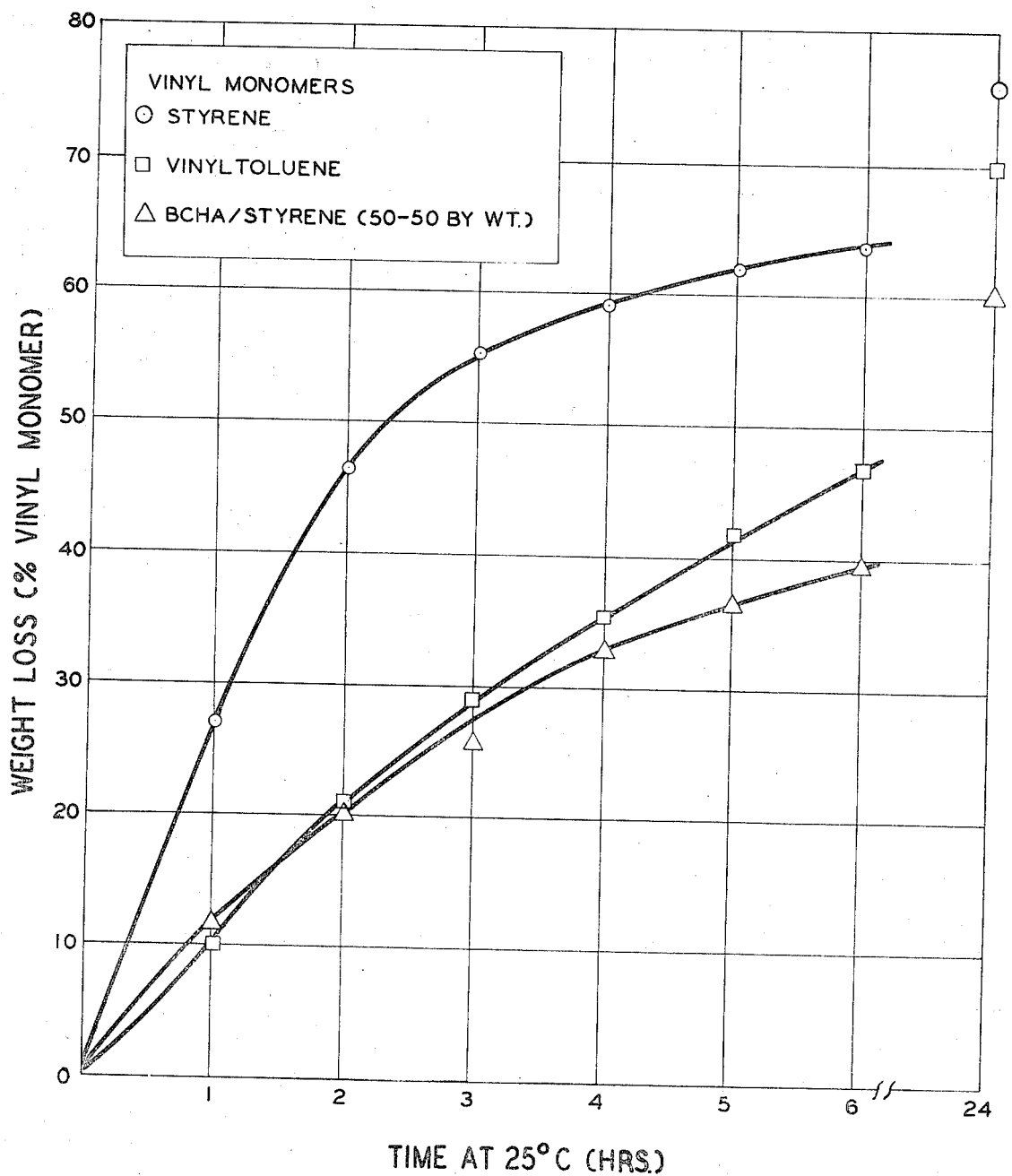

The present invention relates to a novel polyester composition and a method for the reduction of monomer loss from polyester premixes; more specifically the present invention relates to unsaturated polyester resins containing bicyclo[2.2.1]hept-2-yl acrylate and bicyclo[2.2.1]hept-2-yl methacrylate (referred to hereafter as BCHA and BCHMA respectively), and a method for the reduction of monomer loss from unsaturated polyester premixes. The present invention is especially directed to crosslinking unsaturated polyester resins with either BCHA and/or BCHMA alone or together with polymerizable vinyl monomers such as styrene or the like. This invention also relates to the reacted and unreacted compositions obtained thereby.

Because of low cost, good activity and acceptable resin properties, styrene is the most widely used monomer for crosslinking unsaturated polyesters. Molding applications in which unsaturated polyesters are employed generally require that the unsaturated polyester and crosslinking vinyl monomer be mixed with fillers and other molding materials such as reinforcing fibers e.g. glass fiber and the like, prior to introduction into the mold. The premix thus prepared is generally of a dough or putty-like consistency which facilitates handling since the premix thus prepared may be cut into a predetermined size or shape of uniform weight prior to molding. An additional advantage of using premixes is that the compounded polyester may be stored for a short period of time thereby providing greater flexibility in the overall molding operation. Unsaturated polyester premixes however are not without their disadvantages; for example the volatility of styrene type monomers results in high losses of monomer during storage and limits subsequent press temperature thereby increasing press time. For this reason vinyl toluene, which is more costly than styrene and which also decreases the ultraviolet light stability of the crosslinked unsaturated polyester, is often used as an additive to or as a substitute for styrene because of its lower volatility.

Diallyl phthalate is also used for the same purpose as vinyl toluene but is even higher in cost and much less reactive than styrene or vinyl toluene.

Weather resistant polyesters customarily employ a comonomer mixture of methyl methacrylate and styrene. The acrylic ester improves resistance to crazing and discoloration, but the high cost and volatility are prohibitive in most applications.

It is therefore an object of the present invention to overcome these and other difficulties encountered in the prior art. More specifically it is an object of the present invention to provide novel compositions of matter which afford the reduction or elimination of monomer loss from unsaturated polyester premixes and to provide a novel method for reduction or elimination of such monomer losses. It is another object of this invention to provide a novel composition and method for not only reducing monomer loss in unsaturated polyester premixes but also to provide a low cost unsaturated polyester premix having good shelf life, low cost and acceptable levels of U.V. light stability when cured or crosslinked.

These and other objects are achieved by employing BCHA and/or BCHMA acrylic monomers alone or together in combination with an unsaturated polyester. In another aspect of the invention, BCHA and/or BCHMA may be used together with a vinyl monomer such as styrene in combination with an unsaturated polyester.

BCHA and BCHMA are prepared by the addition of acrylic and methacrylic acids to bicycloheptene, the latter being prepared by the Diels-Alder reaction of cyclopentadiene and ethylene. The reactive or crosslinking acrylic BCHA and BCHMA monomers employed according to the present invention may be represented by the following formula:

(I)

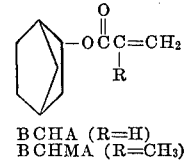

BCHA (R=H)
BCHMA (R=CH₃)

Polyesters useful in the invention include those derived by reaction of one or more polyols, especially diols or glycols with one or more polycarboxylic acids, especially dibasic acids and/or anhydrides, where at least one of the acids in unsaturated, especially aliphatic unsaturated acids (e.g., maleic or fumaric), to a molecular weight of around 200 to around 6000. The polyesters can be hydroxyl- or carboxyl-terminated and include those modified by the addition of monohydric alcohols (e.g., allyl alcohol) or monocarboxylic acids (e.g., acrylic acid) during the cook. The preferred polyesters are those having an acid number of about 10 to about 50 and a molecular weight in the range of about 2000 to about 5000, obtained from approximately equimolar amounts of diol and dibasic acid, and which also contain fumarate unsaturation. Compositions comprising from about 10 to about 90 weight percent (preferably about 50 to about 80 weight percent) polyester and from about 90 to about 10 weight percent, preferably about 50 to about 20 weight percent of monomer may be used. The expression "monomer" as used herein is intended to include acrylic BCHA and/or BCHMA monomers or combinations thereof with vinyl monomers.

The unsaturated polyesters that are employed according to the present invention comprise compositions that are well known to a person having ordinary skill in the art but may generally be characterized as those obtained by the reaction of one or several of the following unsaturated acids with one or several of the following alcohols and optional acids and alcohols:

(I) UNSATURATED POLYCARBOXYLIC ACID OR ANHYDRIDES

Itaconic acid
Citraconic acid
Maleic acid
Fumaric acid (II) POLYOLS

Ethylene glycol
Propylene glycol
Trimethylene glycol
1,3-butanediol
1,4-butanediol
2,3-butanediol
2,4-pentanediol
1,5-pentanediol
1,6-hexanediol
2,5-hexanediol
2-methyl-1,3-pentanediol
2-methyl-2,4-pentanediol
2,3-dimethyl-2,3-butanediol (pinacol)
2,4-heptanediol
2,2-diethyl-1,3-propanediol
2-ethyl-1,3-hexanediol
2-ethyl-2-n-butyl-1,3-propanediol
Diethylene glycol
Triethylene glycol
Tetraethylene glycol
Dipropylene glycol
1,4-cyclohexane dimethanol (III) OPTIONAL MODIFIERS (a) Saturated or unsaturated polycarbocylic acids or anhydrides Saturated:
  Oxalic
  Malonic
  Succinic
  Glutaric
  Adipic
  Pimelic
  Suberic
  Azelaic
  Sebacic
  Tricarballylic
  Camphoric (cis-1,2,2-trimethyl-1,3-cyclopentanedicarboxylic)

Unsaturated:
  Phthalic
  Isophthalic
  Terephthalic
  Diphenic
  Mellitic
  Homophthalic
  o-phenylenediacetic
  Acetylene dicarboxylic acid
  Aconitic acid (1,2,3-propenetricarboxylic)
  Carbic anhydride (Nadic anhydride, Endic anhydride)
  Metal carbic anhydride
  Tetrahydrophthalic anhydride
  Methyltetrahydrophthalic anhydride
  Dodecenylsuccinic acid (b) SATURATED OR UNSATURATED ALCOHOLS Saturated:
  Methyl alcohol
  Ethyl alcohol
  Propyl alcohol
  Butyl alcohol
  Amyl alcohol
  Hexyl alcohol
  Heptyl alcohol
  Octyl alcohol and isomers thereof.

Unsaturated:
  2-butene-1,4-diol
  2-butyne-1,4-diol
  3-cyclohexene-1,1-dimethanol
  Allyl alcohol
  Propargyl alcohol
  Crotyl alcohol
  Oleyl alcohol
  Citronellol alchol Alicyclic:
  Cyclopentanol
  Cyclohexanol
  Menthol
  Borneol Aralkyl:
  Benzyl alcohol
  β-Phenylethyl alcohol
  α-Methylbenzyl alcohol
  Hydrocinnamyl alcohol
  Benzohydryl alcohol
  Triphenylcarbinol
  Cinnamyl alcohol Heterocyclic alcohols:
  Furfuryl alcohol
  Tetrahydro furfuryl alcohol (c) POLYHYDROXYALIPHATIC ALCOHOLS Glycerol
Trimethylolpropane
Pentaerythritol
D-Manitol
Sorbitol (d) Saturated or unsaturated mono-basic acids

| | |
|---|---|
| Formic | b b b |
| Acetic | cmf cm cmc |
| Propionic | vbg vbvbv |
| Butyric | vbg vb vbvbv |
| Isobutyric | b b bb |
| Valeric | vbg vbvbvb |
| Isovaleric | cmf cmc |
| Caproic | cm cm cmcc |
| Enanthic | cm cm mcc |
| Caprylic | cm cm cmmc |
| Pelargonic | bmmmm |
| Capric | vb vb vbvbvb |
| n-Undecylic | b bbvvv |

Saturated high M.W.:

| | |
|---|---|
| Lauric | cm ccc |
| Myristic | bmmm |
| Palmitic | bbb |
| Margaric | cm ccc |
| Stearic | b bbbb |
| Arachidic | vbg vb vb |
| Behenic | mm mb |
| Lignoceric | mf mf mf |
| Cerotic | m m m |
| Melissic | m m |

Unsaturated:
  Acrylic
  Methacrylic
  Crotonic
  Isocrotonic
  Propriolic
  Sorbic Unsaturated high M.W.
  Oleic
  Elaidic
  Erucic
  Linolenic
  Linoleic
  α-Eleostearic
  β-Eleostearic
  α-Linoleic Aromatic:
  Benzoic          vbg vbvbv
  1-naphthoic       vb vbvvv
  2-naphthoic       cm cm cm
  o-Toluic                bb
  m-Toluic          cm cm mc
  p-Toluic             m mb (e) Unsaturated modifiers

 Cyclopentadiene

 Dicyclopentadiene

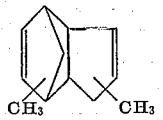 Dimethyl cyclopentadiene

An equivalent class of unsaturated modifiers suitable for the purpose of the present invention comprises the 5-alkylidene substituted (2.2.1)bicycloheptenes of the following formula:

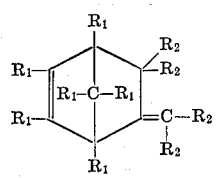

Where $R_1$=hydrogen or lower alkyl and $R_2$=hydrogen or 1–6 carbon atom hydrocarbon moieties. Specifically there may be mentioned in this regard 4-methylene(2.2.1)bicycloheptene, 5-ethylidene(2.2.1)bicycloheptene and 5-isopropylidene(2.2.1)bicycloheptene.

The unsaturated polyester resin is obtained by methods known in the art whereby the aforementioned alcohols and acids are reacted at elevated temperatures to promote a condensation reaction. The unsaturated modifiers may be added to the polyester reactants before, during or toward the end of the condensation reaction.

The optional modifiers are generally employed in amounts from 0 to about 50% by weight, especially up to about 30% by weight and preferably up to about 25% by weight based on the total weight of the unsaturated polyester. Where the optional modifiers comprise either acids or alcohols they are used as substitutes for either the unsaturated polycarboxylic acid or polyol.

The monomer used in combination with the unsaturated polyesters of the present invention may contain all acrylic BCHA and/or BCHMA monomer or mixtures with vinyl monomers. Ranges from about 100 to about 20 weight percent, preferably about 50 to about 30 weight percent of BCHA and/or BCHMA based on the total monomer may be used. Any combination of BCHA and BCHMA may be used when they are employed together. Vinyl comonomers when used as the balance in the aforementioned combination with the acrylic BCHA and BCHMA monomers includes styrene, vinyltoluene, chlorostyrene, vinyl acetate, α-methyl styrene, acrylonitrile, divinyl benzene, diallyl phthalate, acrylamide; acrylic acid, methacrylic acid and the methyl, ethyl, propyl, and butyl esters of both of these acids; vinyl methyl ether, vinyl ethyl ether, triallyl cyanurate and the like or any combination thereof.

The following nonlimiting examples are included as illustration of certain embodiments of the invention. The percentage values for the ingredients given in the examples are on a weight basis unless otherwise noted.

EXAMPLE 1

Three premixes comprising an unsaturated polyester and a vinyl crosslinking monomer are prepared and designated premixes A, B and C respectively.

Premix A is prepared by adding 0.01 percent hydroquinone to 500 grams of a commercially available unsaturated polyester resin based on maleic and phthalic acids and a slight stoichiometric excess of propylene glycol and containing 30 percent by weight of styrene and having a softening temperature of 78° C. The styrene is removed at 100° C. at less than 1 mm. mercury pressure by heating the unsaturated polyester resin in a vacuum evacuated kettle on a hot water bath. The residue is then diluted with 16.5 percent styrene and 16.5 percent methyl methacrylate.

Premix B is prepared in the same manner as premix A except that 16.5 percent by weight of BCHMA is substituted for the methyl methacrylate.

Premix C comprises the unsaturated polyester resin of premix A in which the styrene monomer is not removed.

One (1.0) weight percent of a catalyst comprising benzoyl peroxide and 0.05 wt. percent dimethylaniline (DMA) is added to (450 gms.) each of the premixes A and B after which they are heated to 38–40° C., deaerated and poured into ¼″ and ⅛″ plaque molds at room temperature. Three hundred grams of premix C is similarly heated and deaerated and introduced into a ¼″ plaque mold while 150 grams is used for a ⅛″ mold.

Plaques made from premixes A and C both gelled at room temperature after one hour and are subsequently cured for one hour at 100° C. The plaques prepared from premix B however gelled after 17 hours at room temperature and were subsequently cured for 1 hour at 100° C. The shrinkage is evaluated after curing one hour at 100° C. and the results summarized below in Table I.

Various physical properties of resin plaques prepared are also determined as well as the chemical resistant properties both of which are summarized below in Tables II and III respectively.

TABLE I

Shrinkage

| | Percent |
|---|---|
| Premix A: | |
| ⅛″ plaque | 0.381 |
| ¼″ plaque | 1.53 |
| Premix B: | |
| ⅛″ plaque | 0.567 |
| ¼″ plaque | 0.39 |
| Premix C: | |
| ⅛″ plaque | 2.05 |
| ¼″ plaque | 1.62 |

TABLE II

| | Pre-mix | A | | B | | C | |
|---|---|---|---|---|---|---|---|
| Heat distortion temperature (HDT), °C | 70 | [1] (65) | 60 | [1] (60°) | 79 | [1] (77) | |
| Tested at (° F.) | (2) | 160 | (2) | 160 | (2) | 160 | |
| Tensile strength, p.s.i | 9,380 | 559 | 8,950 | 398 | 8,220 | 1,657 | |
| Percent elongation | 1.8 | 29 | 1.9 | 28 | 1.6 | 15 | |
| Modulus of elasticity p.s.i.×10⁵ | 5.85 | 2.95×10³ | 5.29 | 3.85×10³ | 5.77 | 0.297×10³ | |
| Flexural strength, p.s.i | 18,020 | | 14,320 | | 18,970 | | |
| Flexural modulus, p.s.i.×10⁵ | 5.96 | | 5.54 | | 5.83 | | |
| Compressive strength, p.s.i | 23,400 | | 23,100 | | 23,900 | | |
| Compressive modulus, p.s.i.×10⁵ | 4.80 | | 4.76 | | 4.83 | | |
| Izod impact, ft. lbs./in | <0.1 | | <0.1 | | <0.1 | | |
| Barcol 935 hardness | 88 | | 86 | | 89 | | |

[1] Post cured (1 hr. 150° C.).
[2] Room temperature.

TABLE III.—CHEMICAL RESISTANCE

| | A | | B | | C | |
|---|---|---|---|---|---|---|
| 72 hr. boiling | H₂O | 5% NaOH | H₂O | 5% NaOH (46 hrs.) | H₂O | 5% NaOH |
| Percent wt. gain | 3.06 | (¹) | 1.95 | 1.36 | 2.43 | (¹) |
| Flexural strength, p.s.i | 1,662 | | 889 | 901 | 1,143 | |
| Percent retention flexural strength | 9.2 | | 6.2 | 6.3 | 6.0 | |
| Flexural modulus p.s.i. × 10⁵ | 1.43 | | 0.98 | 0.23 | 1.02 | |
| Percent retention flexural modulus | 24.0 | | 17.6 | 4.1 | 1.75 | |

[1] Disintegrated in 46 hrs.
[2] Loss.

Thus it can be seen from the above example that not only does BCHMA reduce the shrinkage of unsaturated polyester premixes containing vinyl unsaturated monomers but also affords increased pot life without sacrificing the physical or chemical properties of the cured polyester premix.

EXAMPLE 2

An unsaturated polyester derived from 2.0 moles of maleic anhydride per mole of phthalic anhydride and a 10 percent excess of propylene glycol is mixed with BCHA and styrene and BCHMA and styrene. A control comprising a 60–40 blend (by weight) of the unsaturated polyester and styrene is also formulated and evaluated to provide a comparison with styrene as the only monomer employed for crosslinking the unsaturated polyester and the physical properties and chemical resistance properties of all three blends are evaluated and tabulated in Table IV.

The change in resin color during ultraviolet exposure is directly related to degradation, which can be accelerated at elevated temperature. The color change can be measured using a galvanometer which can be calibrated to give the percent light reflected from the sample. The photovolt meter is also equipped with a monochromatic filter which allows only light at a wave length of 440 millimicrons to pass through the sample. The amount of this blue light which is absorbed by the sample is related to the yellowness of the sample. Blue light reflectance is measured before and after irradiation and the difference is a measure of degradation. In conducting the test small holes are drilled in 1 x 2 x ⅛ inch prepared panels to permit hanging from wire hooks. The initial reflectance of the samples is measured by the photovolt reflectance meter, model 610, Photovolt Corp., 95 Madison Ave., New York 16, N.Y. The samples are then hung in a circulating-air oven equipped with a 275 watt sun lamp at a distance of 2.5 to 3.0 inches from the sun lamp. The sun lamp is turned on and the oven is heated to 80° C. The amount of degradation is measured after each 2 hour interval by the photo-volt reflectance meter. Change in reflectance (ΔR) is calculated by subtracting blue light reflectance after irradiation from the initial reflectance.

TABLE IV

| | Bicyclo[2.2.1]hept-2-yl | | Control, no modifier |
|---|---|---|---|
| | Acrylate | Methacrylate | |
| Formulation: | | | |
| Polyester, percent [1] | 51.3 | 50.1 | 60 |
| Styrene, percent | 17.1 | 16.7 | 40 |
| Styrene/maleate, mole ratio | 0.85 | 0.85 | 1.7 |
| Acrylate monomer, percent | 31.6 | 33.2 | 0 |
| Acrylate monomer/maleate mole ratio | 0.98 | 1.0 | |
| Uncured resin properties: | | | |
| Viscosity, cps. at 25° C | 425 | 460 | 310 |
| Color, Pt-Co | 55 | 60 | 55 |
| Acid number | 23 | 23 | 27 |
| Catalyst | 1% by weight dibenzoyl peroxide based on polyester and monomer | | |
| Cure, hrs./temp | 16/50—1/70—1/100—3/125 | | |
| Cured resin properties: | | | |
| Deflection temperature, °C | 74 | 84 | 127 |
| Tensile, p.s.i | 3,100 | 12,150 | 7,100 |
| Elongation, percent | 1.7 | 3.3 | 1.4 |
| Modulus of elasticity, p.s.i.×10⁵ | 5.33 | 5.55 | 5.2 |
| Flexural strength, p.s.i | 13,800 | 13,000 | 12,700 |
| Flexural modulus, p.s.i.×10⁵ | 5.40 | 5.53 | 5.19 |
| Compressive strength, p.s.i.×10⁵ | [2] 19,500 | [2] 22,000 | [2] 18,900 |
| Compressive modulus, p.s.i.×10⁵ | 5.29 | 5.64 | 5.34 |
| Izod impact, ft. lbs./in | 0.18 | 0.22 | 0.15 |
| Barcol 935 hardness | 87 | 88 | 87 |
| 24 hour boil in water: | | | |
| Wt. change, percent | −2.0 | −1.9 | [3] −2.0 |
| Flexural strength, p.s.i | 5,550 | 4,575 | [3] 8,320 |
| Percent retention flexural strength | 40.2 | 38.7 | [3] 87.1 |
| 24 hour boil in 5% NaOH: | | | |
| Wt. change, percent | −29.4 | −1.2 | [3] −2.0 |
| Flexural strength, p.s.i | 6,500 | 1,900 | [3] 8,200 |
| Percent retention flexural strength | 47.0 | 16.0 | [3] 77.0 |
| Initial blue light reflectance, percent | 78 | 71 | 88 |
| U.V. resistance, ΔR (96 hrs. at 80° C.) | 26 | 23 | 33 |

[1] Formulation: 2.0 moles maleic anhydride per 1.0 mole of phthalic anhydride and a 10% excess of propylene glycol.
[2] NB=Non-break.
[3] 72 hour boils.

As can be seen from the preceding table both the BCHA and BCHMA modified resins provided a significant improvement in ultraviolet resistance for the cured polyester as compared to the styrene modified type. Furthermore, the physical properties of the cured polyester are enhanced by BCHA or BCHMA modification.

EXAMPLE 3

An unsaturated polyester is prepared comprising 1.05 moles of dipropylene glycol per 1.0 mole of maleic anhydride having an acid number of 29. The polyester is inhibited using 0.01 percent hydroquinone and blended with freshly distilled uninhibited monomer to provide 3 blends of unsaturated polyesters containing in one case 30 percent styrene (formulation 1) and in a second case 32.7 percent vinyltoluene (formulation 2), and in a third case 36 percent BCHA-styrene 50-50 by weight (formulation 3). Each of the three resultant polyesters contain a monomer/maleate mole ratio of 0.91. The properties of the cured and uncured polyester mixtures are then determined and tabulated below in Table V.

TABLE VI.—VOLATILITY OF VINYL MONOMER IN POLYESTER PREMIX RESINS OF EXAMPLE 3 AT 25° C. PERCENT VINYL MONOMER LOST

| Formulation No. time, hrs. at 25° C. | 1, styrene | 2, vinyl-toluene | 3, BCHA/styrene (50-50 by wt.) |
|---|---|---|---|
| 1 | 29.95 | 10.12 | 11.43 |
| 2 | 46.32 | 20.59 | 20.02 |
| 3 | 54.99 | 28.94 | 25.62 |
| 4 | 59.00 | 35.40 | 32.75 |
| 5 | 61.79 | 41.71 | 36.33 |
| 6 | 63.75 | 46.74 | 39.42 |
| 24 | 75.75 | 69.72 | 61.10 |

TABLE VII.—VOLATILITY OF VINYL MONOMER IN POLYESTER PREMIX RESINS OF EXAMPLE 3 AT 100° C. PERCENT VINYL MONOMER LOST

| Formulation No. time, min. at 100° C. | 1, styrene | 2, vinyl-toluene | 3, BCHA/styrene (50-50 by wt.) |
|---|---|---|---|
| 5 | 78.3 | 68.1 | 54.5 |
| 10 | 85.5 | 73.8 | 62.6 |
| 15 | 88.0 | 77.0 | 70.6 |
| 20 | 92.3 | 79.6 | 74.6 |
| 25 | 94.5 | 82.0 | 77.6 |

EXAMPLE 5

A polyester resin is prepared and crosslinked with BCHA and the results reported below in Table VIII.

TABLE V.—COMPARISON OF STYRENE, VINYLTOLUENE, AND BICYCLOHEPTYL ACRYLATE-STYRENE AS CROSSLINKING AGENTS FOR A MALEIC ANHYDRIDE-DIPROPYLENE GLYCOL POLYESTER [1]

|  | 1, styrene | 2, vinyltoluene | 3, BCHA/styrene [3] (50/50 by weight) |
|---|---|---|---|
| Formulation |  |  |  |
| Polyester, percent | 70 | 67.3 | 64.0 |
| Vinyl monomer, percent | 30 | 32.7 | 36.0 |
| Vinyl monomer/maleate, mole ratio | 0.91 | 0.91 | 0.91 |
| Hydroquinone, percent by weight | 0.0070 | 0.0067 | 0.0064 |
| Uncured resin properties: |  |  |  |
| Viscosity, cps. at 25° C | 415.5 | 411.0 | 428.0 |
| Color, Pt-Co | 80-100 | 70-80 | 80 |
| SPI gel time, min./sec | 3/32 | 2/55 | 3/54 |
| Peak exotherm, °C | 242 | 236 | 235 |
| Peak time, min./sec | 5/30 | 5/0 | 6/2 |
| Volatility,[2] percent monomer loss after 5 hrs. at 25° C | 61.79 | 41.71 | 36.33 |
| Volatility,[3] percent monomer loss after 5 min. at 100° C. | 78.3 | 68.1 | 54.5 |
| Catalyst | \multicolumn{3}{c}{1% by weight dibenzoyl peroxide based on polyester and monomer} |
| Cure, hrs./° C | \multicolumn{3}{c}{2/60+3/125} |
| Cured resin properties: |  |  |  |
| Heat distortion, °C | 105 | 94 | 83 |
| Tensile, p.s.i | 7,600 | 7,600 | 7,600 |
| Elongation, percent | 3.4 | 3.1 | 3.5 |
| Modulus of elasticity, p.s.i.×10[5] | 3.95 | 3.95 | 3.85 |
| Barcol 935 hardness | 86 | 86 | 85 |

[1] Polyester derived from 1.05 moles DPG/1.0 mole of M.A. and diluted to contain either 30% styrene, 32.7% VT, or 36% BCHA-styrene.
[2] Determined as follows: approximately 2.7 grs. of uncatalyzed resin was weighed (to the nearest 0.1 mg.) into an aluminum dish (2.25 inch diameter). The dish was allowed to stand at room temperature and periodically reweighed to determine loss of vinyl monomer.
[3] Same as [2] except resin samples were exposed to 100° C. in a circulating air oven.

As can be seen by reference to the preceding table, BCHA/styrene modified unsaturated polyesters have identical properties with polyesters modified by vinyltoluene. One advantage of the present invention resides in employing BCHA/styrene modified unsaturated polyesters to obtain polyester premixes having lower volatility than prior art formulations. This is readily apparent from the data of the next example.

EXAMPLE 4

The uncured polyesters of Example 3 are evaluated to determine the amount of vinyl monomer lost over a period of time at 25° C. and 100° C. Approximately 2.7 grams of uncatalyzed resin is weighed to the nearest 0.1 mg. into an aluminum dish 2.25″ in diameter. The dish is allowed to stand at room temperature (25° C.) or exposed to 100° C. temperatures in a circulating air oven and periodically reweighed to determine loss of vinyl monomer. The results of these evaluations are summarized below in Tables VI and VII.

TABLE VIII

The effects of bicycloheptyl acrylate on properties of an unfilled polyester resin [1]

| Formulation: |  |
|---|---|
| Polyester [2] | 71.5 |
| BCHA (uninhibited) | 28.5 |
| Hydroquinone, p.p.m. | 50 |
| Uncured resin properties: |  |
| Viscosity, cps. at 25° C. | 43,900 |
| Gel time, sec. at 297° F. | 22 |
| Peak exotherm, ° C. at 297° F. | 207 |
| Peak time, sec. at 297° F. | 55 |
| Cured resin properties: |  |
| Deflection temperature, ° C. | 45 |
| Tensile, p.s.i. (yield/break) | 7,250/6,750 |
| Elongation, percent | 3.4/4.3 |
| Modulus of elasticity, p.s.i.×10[5] | 4.47 |
| Flexural strength, p.s.i. | 15,650 |
| Flexural modulus, p.s.i.×10[5] | 4.09 |
| Barcol 935 hardness | 83 |

[1] 0.84 mol of acrylic BCHA monomer per mole of maleate.
[2] A resin is prepared using 4.0 moles of maleic anhydride per 3.0 moles isophthalic acid and a 5 percent excess of an 80-20 weight mixture of diethylene and ethylene glycols and 150 p.p.m. hydroquinone.

It has also been observed that the use of or substitution of BCHA and/or BCHMA for styrene or similar vinyl monomers in standard croslinkable unsaturated polyester formulations reduces the crazing. This along with the other enumerated properties comprises another advantage of the present invention.

Substantially the same results are obtained when either BCHA or BCHMA is used alone, in combination together or with other similarly reactive vinyl monomers known in the art with both the aforementioned fumarate polyesters or unsaturated polyesters prepared from any of the specifically mentioned acids, alcohols and unsaturated modifiers.

Figure 2:
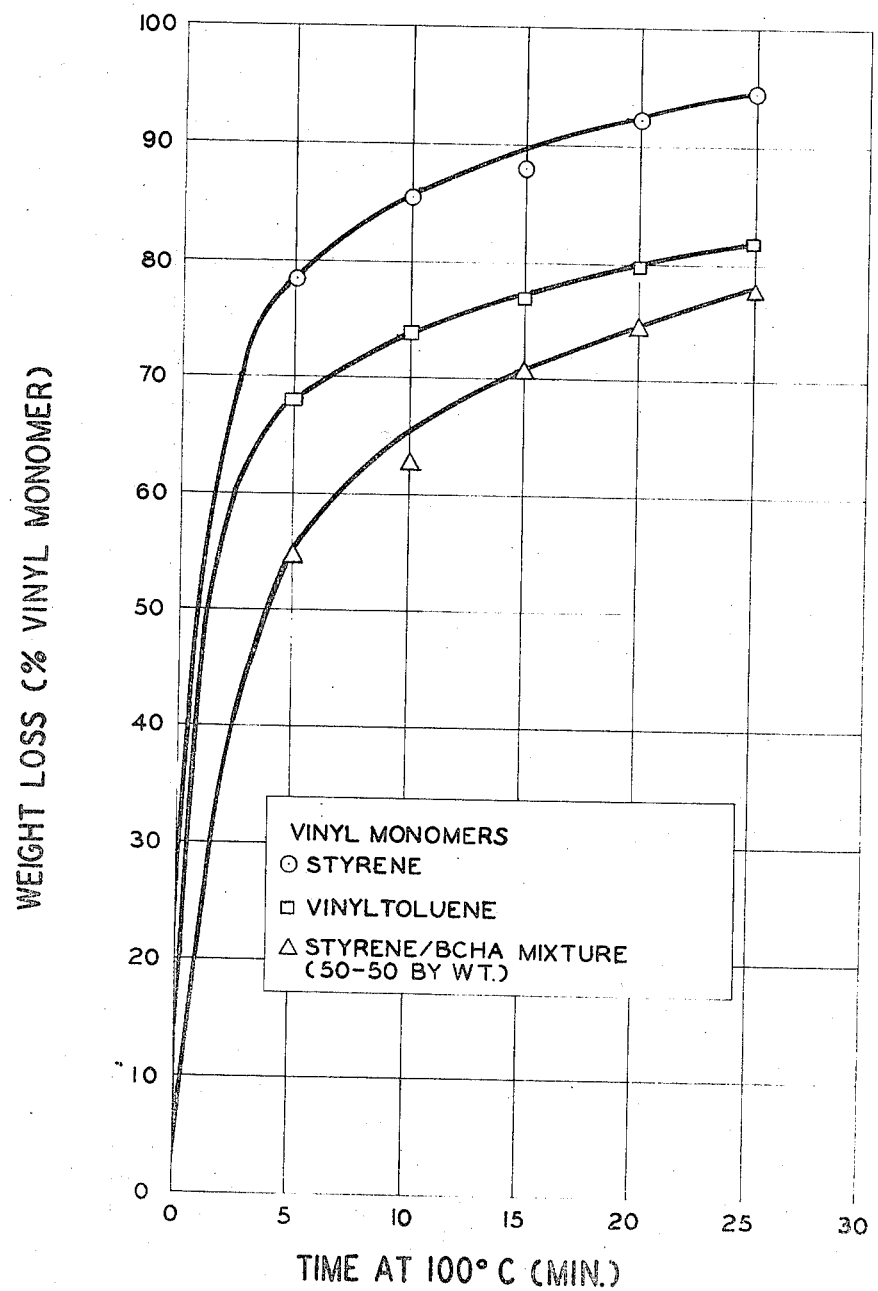

The results obtained from these evaluations are also graphically summarized in FIGS. 1 and 2 from which it can be seen that the BCHA/styrene modified unsaturated polyester affords a great advantage in that monomer loss is substantially reduced both at room temperature and at elevated temperatures. At 25° C. the monomer loss of the styrene modified unsaturated polyester is 50% greater than the BCHA/styrene system after 6 hours. At elevated temperatures the monomer loss of the styrene modified system is approximately 30% higher after 25 minutes at 100° C. Both of these results are extremely significant in those applications in which polyester premixes are stored and where molding processes in which an open-face mold is employed or in coating applications, both of which allow the monomer to escape into the atmosphere both at room temperatures and at elevated curing temperatures. Closed mold applications avoid this to some extent in that during the curing cycle at elevated temperatures, the vinyl monomer is trapped within the mold.

Thus there has been described a novel method and composition comprising the use of BCHA and/or BCHMA as vinyl monomers that may optionally be used in combination with other vinyl monomers for curing unsaturated polyester resins. The advantages of the present invention are two-fold; monomer loss is reduced in unsaturated polyester resin premixes and ultraviolet light stability as compared to styrene modified unsaturated polyesters is greatly improved.

Although the invention has been described by reference to one or more embodiments it is not intended that the broad scope of the novel composition and method be limited thereby but that certain modifications are intended to be included within the spirit and broad scope of the following claims.

What is claimed is:

1. A composition of matter consisting essentially of an unsaturated polyester having a molecular weight of from about 200 to 6000 reacted with from about 10 to about 90 weight percent of a vinyl monomer based on both said unsaturated polyester and said vinyl monomer, from about 20 to 100 percent of said vinyl monomer having the formula:

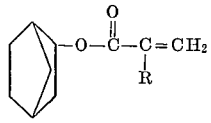

where the radical R may be hydrogen or methyl.

2. The composition of claim 1 where said monomer comprises mixtures of bicycloheptyl acrylate and bicycloheptyl methacrylate.

3. The composition of claim 2 where said unsaturated polyester has an acid number from about 10 to about 50 and contains maleate or fumarate unsaturation.

4. A composition of matter consisting essentially of an unsaturated polyester containing fumarate groups having a molecular weight of about 200 to about 6000, an acid number from about 10 to about 50 reacted with from about 90 to about 10 weight percent of an unsaturated monomer based on said unsaturated polyester and said unsaturated monomer, from about 100 to about 20 weight percent of said monomer having the formula:

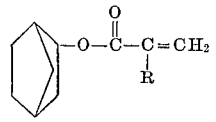

where R may be hydrogen or methyl, the balance of said monomer being selected from a member of the group consisting of styrene, alpha-methyl styrene, vinyltoluene, chlorostyrene and mixtures thereof.

5. The composition of claim 4 where said unsaturated polyester contains from about 50 to about 20 weight percent of said unsaturated monomers.

References Cited

UNITED STATES PATENTS

| | | | |
|---|---|---|---|
| 3,038,887 | 6/1962 | Caldwell et al. | 260—78.5 |
| 3,255,165 | 6/1966 | Welch | 20—86.3 |

FOREIGN PATENTS

| | | | |
|---|---|---|---|
| 1,097,674 | 1/1961 | Germany | 260—871 |

WILLIAM H. SHORT, Primary Examiner

M. GOLDSTEIN, Assistant Examiner

U.S. Cl. X.R.

260—22